3,780,139
Patented Dec. 18, 1973

3,780,139
SEGMENT COPOLYMERS OF 1,3-DIENES AND AROMATIC VINYL COMPOUNDS
Hubert Sutter, Cologne-Flittard, Karl Nothen, Leverkusen, and Friedrich Haas, Cologne-Buchheim, Germany, assignors to Bayer Aktiengesellschaft, Leverkusen, Germany
Continuation of application Ser. No. 812,080, Apr. 1, 1969. This application Oct. 18, 1971, Ser. No. 190,101
Claims priority, application Germany, Apr. 25, 1968,
P 17 70 261.3
Int. Cl. C08f *19/06, 19/08, 15/04*
U.S. Cl. 260—880 B                                              4 Claims

ABSTRACT OF THE DISCLOSURE

A process for continuously producing segment copolymers from 1,3-dienes and aromatic vinyl compounds in the absence of a solvent with lithium organic compounds as catalysts by using a self-cleaning multiple shaft screw extruder as the polymerization vessel.

CROSS REFERENCE TO RELATED APPLICATION

Figure 1:
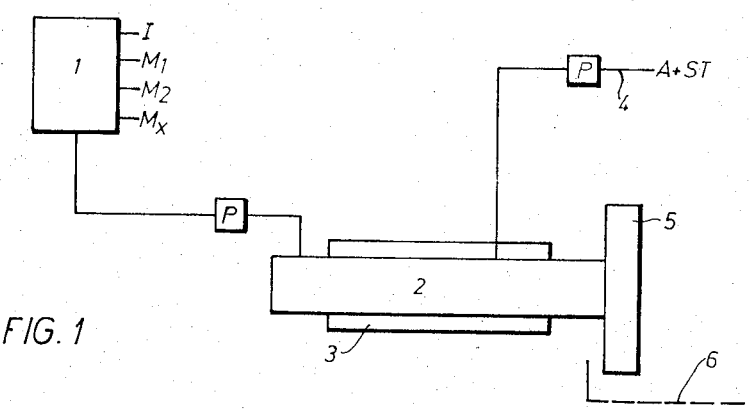

This application is a continuation of application Ser. No. 812,080 filed Apr. 1, 1969, and now abandoned.

Segment or block copolymers are distinguished in their molecular structure by the fact that at least one comonomer is present in the form of a long homopolymer segment or block in the copolymer. The properties of such a segment copolymer are different from those of a random copolymer of the same monomers with the same monomer ratio. Both types of copolymer are known from 1,3-dienes and aromatic vinyl compounds, especially 1,3-butadiene and styrene, and are of commercial interest.

The production of block copolymers from 1,3-dienes and aromatic vinyl compounds, especially 1,3-butadiene and styrene, is described for example in British patent specification No. 888,624. In this specification, the starting material is a solution of the two monomers in a nonpolar, aromatic or cycloaliphatic hydrocarbon which is inert to organo-lithium compounds and the polymerization is started at temperatures above 40° C. with a monofunctional organo-lithium compound. The polymerization proceeds in two subsequent steps: In the first polymerization step, a polymer segment with a "living" chain end is formed from all the 1,3-diolefine and small amounts of the aromatic vinyl compound, and in the second polymerization step, a polymer segment from the residual aromatic vinyl compound grows onto the "living" chain end. The separation of the polymerization steps necessary for the segment synthesis is inevitable when the reaction is operated discontinuously. When the reaction proceeds continuously, this separation has to be effected by very involved technical procedures, which narrow the residence time spectrum; otherwise, a random copolymer is formed.

It has now been found that the segment copolymerization referred to above is also easily possible under continuous reaction conditions in a self-cleaning, two-shaft or multiple shaft screw extruder. In addition, the use of such an extrusion machine permits solvent-free polymerization.

Self-cleaning, multiple shaft screw extruders suitable in this invention are described in German patent specifications Nos. 813,154 and 862,668 and in U.S.A. patent specification No. 940,109.

In principle, what are involved are screw extruders which have two or more conveying shafts, whose threads are in mesh with one another. The shaft preferably rotate in the same direction. The diameters of the shafts and the pitches of the threads are generally constant throughout the lengths of the shafts. In certain cases, for example, when a strong change in volume of the reaction material occurs, or when pressure zones are to be formed, the pitches of the threads may vary. Where intensive mixing is required, short regions of the shaft can also be equipped with kneading discs. The outer housing adjoins the shafts as closely as possible (see FIG. 3). For a sufficiently viscous material, these arrangements provide a compulsory conveying action and are self-cleaning; as a consequence, the reacting material in the screw extruder has a defined and very narrow residence time spectrum. The arrangement thus acts in practice as if the entire reaction volume through which a material conveyed by the machine has to pass is subdivided into a very large number of individual, stirred zones.

Single-shaft screw extruders and multiple shaft screw extruders whose threads are not in mesh with one another have neither a compulsory conveying action nor a self-cleaning action and consequently do not guarantee any definite residence time spectrum; they are unsuitable as screw extruders for polymerization purposes.

The subject of the invention is a process for the solvent-free, continuous segment copolymerization of 1,3-diolefines and aromatic vinyl compounds in self-cleaning, multiple shaft polymerization screw extruders with organo-lithium compounds as initiators.

Butadiene-1,3, isoprene and piperylene are examples of suitable 1,3 - diolefines. Styrene, 3 - methylstyrene, 3-ethylstyrene, 1 - vinylnaphthalene, 2 - vinyl naphthalene and divinyl benzene are examples of suitable aromatic vinyl compounds. In general, suitable monomer combinations consist of a 1,3-diolefine and an aromatic vinyl compound. Mixtures of 1,3-diolefines with an aromatic vinyl compound or mixtures of aromatic vinyl compounds with a 1,3-diolefine or mixtures of both classes can be combined. Butadiene-1,3 and styrene is a preferred monomer combination.

The monomers or their mixture must be dried so that the water content of the monomer mixture is below 20 p.p.m., and advantageously below 10 p.p.m. This can be done in known manner by adsorptive or azeotropic procedures. Care should be taken that, in addition to water, other proton-active substances or substances which react with organo-lithium compounds, especially α-acetylenes in the diene component are also removed.

Organo-lithium compounds which are suitable as initiators correspond to the general formula $R(Li)_x$, in which R represents an aliphatic, cycloaliphatic or aromatic radical as well as a mono- or poly-unsaturated aliphatic radical having the valency $x$, $x$ being an integer of from 1 to 4. Methyl lithium, isopropyl lithium, n-butyl lithium, sec.-butyl lithium, n-decyl lithium, cyclohexyl lithium, phenyl lithium, naphthyl lithium, 4-phenylbutyl lithium, 4-butylcyclohexyl lithium; 1,3-dilithium butane, 1,20-dilithium eicosane, 1,4-dilithium cyclohexane, 1,2-dilithium-1,2-diphenylethane, 1,4-dilithiumbutene-2, α,ω-dilithium-oligo-1,3-dienes of the general formula:

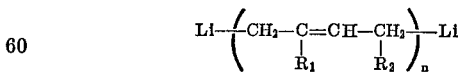

in which $R_1$ and $R_2$=H or $R_1$=H when $R_2$=$CH_3$, or vice versa; 1,2,5-trilithium naphthalene and 1,5,10,20-tetralithium eicosane may be mentioned as examples.' The amount of the organo-lithium initiator added may vary from 0.05 to 5 milliequivalents of Li per 100 g. of monomer mixture, depending on the monomer ratio and the impurity in the reaction mixture and depending on the required size of molecule of the copolymer.

When choosing the lithium initiator, it is important also to consider the desired segment sequence in the copolymer as well as the solubility and the reactivity. If AAAA is the polymer segment built up predominantly of 1,3-diolefine, BBBB is the polymer segment of the aromatic vinyl compound and $R^nLi_n$ are the organolithium initiators of the functionality $n$ ($n$ in this case represents the valency of the radicals R and the number of lithium atoms, and is preferably 1 to 4), then with a monofunctional initiator (R'Li), block copolymers of the Formula I are obtained, whereas with a bifunctional initiator (R''Li$_2$), block copolymer of the Formula IIa are obtained, while with a trifunctional initiator (R'''Li$_3$), those of Formula IIIa are obtained, and so on.

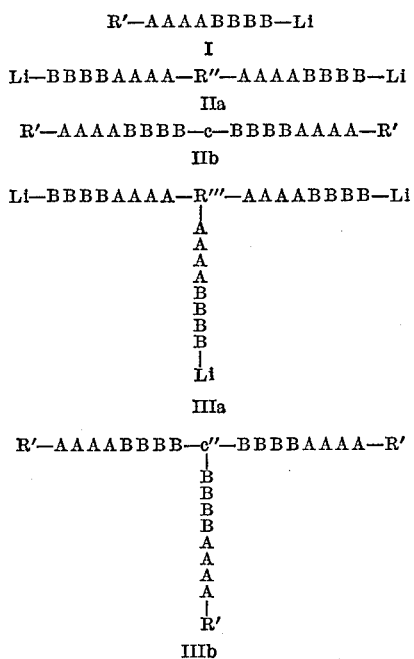

If it is desired to produce a reversal of the sement sequence according to the Formulae IIb and IIIb, a plurality of block copolymers of the Formula I are coupled with a bifunctional or polyfunctional coupling agent (c,c'') as indicated, see below. The reversal of the segment sequence can also be achieved by a technical processing procedure, as set out in detail below.

The manner in which the process according to the invention functions is now explained with reference to FIG. 1 of the accompanying drawing.

The reaction mixture of the 1,3-diolefine M$_1$, the aromatic vinyl compound M$_2$, possibly one or more additional monomers M$_x$ and the initiator I is prepared in a premixer 1 which can be cooled. Using a proportioning pump P, the reaction mixture is supplied in measured quantities to a self-cleaning, two-shaft screw extruder 2 (the letter P represents a pump in all the figures). The rotation of the screw shafts is so chosen that the feed corresponds approximately to the volume of the reaction mixture introduced. The reaction temperature in the extruded is from 50° C. to 150° C. and is set and regulated by means of a coolant or heating medium through heating or cooling jackets 3, which often may be subdivided into zones. The temperature in the reaction chamber is controlled by means of a plurality of heat-sensing devices (e.g. resistance thermometers).

Figure 3:
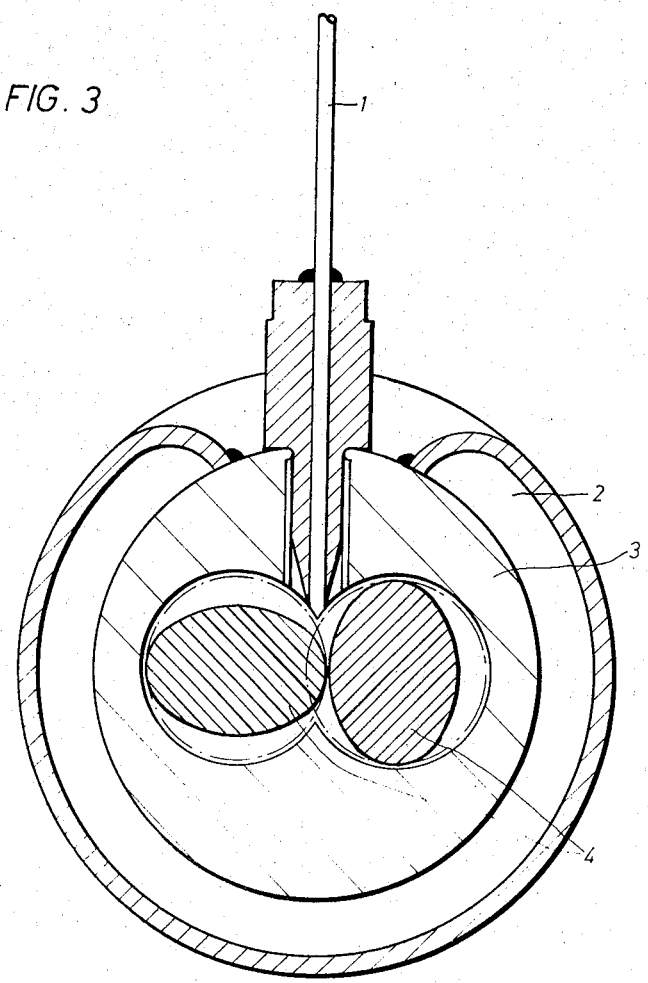

FIG. 3 is a cross-section of a self-cleaning screw extruder, comprising heat-sensing devices 1, heating or cooling jackets 2, a screw housing 3 and two screw shafts 4.

A stopper-stabilizer combination is fed into approximately the last quarter of the apparatus through a pipe 4 (FIG. 1) for stopping and stabilizing the copolymers. The reaction generally proceeds with a complete conversion. The hot copolymer is extruded through a nozzle plate and is simultaneously granulated in a granulator 5; for cooling purposes, the hot granulate is sprayed with water. The surface-moist granulate drops on to a shaker trough 6 and dries thereon while cooling.

The throughput per unit of volume and time is very high with the process according to the invention and is generally between 2 and 6 l./l.h.; this corresponds to a residence time of 30–10 minutes.

Figure 2:
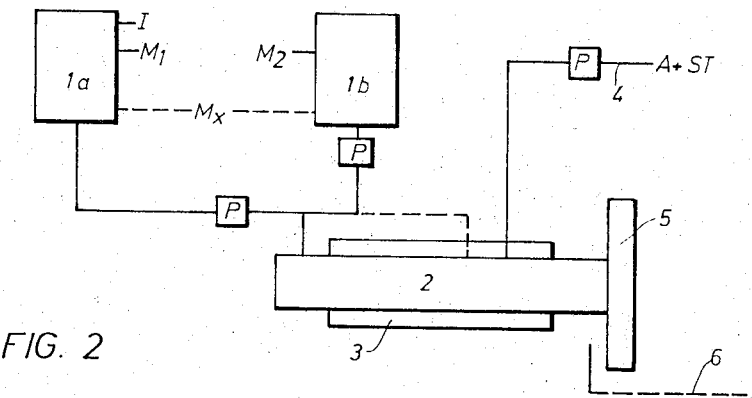

The process can obviously be varied as desired within the scope of the invention. By way of example, the monomers M$_1$, M$_2$ and possibly M$_x$ can also be measured out separately, as shown in FIG. 2; in this case, the initiator is mixed with one of the monomer components or added to it separately in a measured quantity. Another variant is for example that in which, as indicated in FIG. 2, the monomer M$_2$ is introduced in a measured quantity into the second half of the worm; this may be of interest if it is desired to reverse the segment sequence of diolefine/aromatic vinyl compound. The stopper may likewise act as a bunfunctional or polyfunctional coupling agent which links two or more living chain ends to one another. Coupling agents in this sense are polyvinyl compounds and polyhalogen compounds, such as divinylbenzene, trivinylbenzene, dichloromethane, trichloromethane and tetrachloromethane, dichlorosilane and trichlorosilane, silicon, tetrachloride and others, as well as analogous bromine and iodine compounds are coupling agents in this sense.

With the process according to the invention, the properties of the copolymers can be influenced by reaction temperature and residence time as well as by the choice of monomer, the monomer proportion and the nature of the initiator.

The range of variation in the process according to the invention can be appreciated from the description of the process. Attention should also be drawn to the technical processing and economic advantages which are already obtained by omitting such tedious processing steps as solvent recovery, solvent drying and rubber drying, as compared with the conventional segment polymerization in solution; as a consequence and also because of the very high throughput per unit of volume and time, only a small area and volume is required for carrying out the process of the invention.

The invention is illustrated by the following examples. The parts indicated are parts by weight, if not otherwise defined.

EXAMPLES 1 TO 3

The experimental arrangement corresponds to the diagram in FIG. 1. The polymerization worm is a self-stripping two-shaft worm with a length of 1 metre. The worm shafts are made of chrome steel and have a diameter of 32 mm. externally and 24 mm. in the core; the worm shafts are of the two-thread type and have a pitch of 12 mm. The free reaction volume amounts to 450 ml.

A mixture of 65 parts of butadiene-1,3-, 35 parts of styrene and 0.13 part of n-butyl lithium (2 mMol/100 g. of monomer mixture) is disposed in the brine-cooled mixing vessel 1. Varying quantities of this mixture are fed per unit of time into the polymerization worm (see Table 1 which shows the associated volume-time throughput (VTT) in litres of reaction mixture per litre of reaction space per hour and the associated (mean) residence time in minutes (RT) of the reaction mixture in the worm).

The copolymer is stopped and stabilised in the worm with 1% of stearic acid and 0.5% of ionene, respectively, based on rubber. Examples 1–3 and some results of the examples are set out in Table 1.

TABLE 1

| Ex. | Input, ml./h. | VTT, l./l. h. | RT, min. | Temp., °C.[1] | Yield, percent | ML-4[2] | Total styrene, percent[3] | Block styrene, percent[4] Abs. | Block styrene, percent[4] Rel. |
|---|---|---|---|---|---|---|---|---|---|
| 1 | 900 | 2 | 30 | 60-80 | 100 | 48-52 | 34.2 | 26.6 | 78 |
| 2 | 1,800 | 4 | 15 | 70-90 | 100 | 47-50 | 35.0 | 25.2 | 72 |
| 3 | 2,700 | 6 | 10 | 70-100 | 100 | 48-53 | 34.7 | 25.4 | 73 |

[1] Temperature curve in the direction of the product stream.
[2] Highest and lowest Mooney value of a constant running period.
[3] Determined in ultra-violet light.
[4] Determined by oxidising degradation according to British Pat. No. 888,624.

Examples 1 to 3 show that the capacity of the worm is still not reached even with the very high volume-time throughput of 6 l./l.h., corresponding to a residence time of only 10 minutes.

EXAMPLE 4

The experimental arrangement corresponds to that in Example 1, but using the diagram in FIG. 2, the second monomer component (styrene) being introduced in measured quantity separately from the first (isoprene) in the second half of the worm.

A mixture of 100 parts of isoprene and 0.11 part of sec.-butyl lithium (about 1.7 mMol/100 g. of monomer mixture) is disposed in the mixing vessel 1a, which is cooled with iced water or brine. Dry styrene is provided in the vessel 1b. First of all, from the vessel 1a, the isoprene-initiator solution is introduced in a quantity of about 1430 ml./h. into the polymerization worm, which is heated to 60–70° C., until a low molecular weight, greasy isoprene polymer emerges at the nozzle plate. The introduction of styrene is then started with a quantity of about 595 ml./h. The temperature behind the point of introduction of the styrene rises spontaneously to about 130° C. and is kept by cooling at about 120° C. A few minutes after starting the introduction of the styrene, a solid copolymer issues from the worm and this copolymer is stopped and stabilised as in Examples 1 to 3.

The VTT under these conditions is 4.5 l./l.h., corresponding to an RT of 13 minutes. The Mooney value of the copolymer lies bettween 50 and 55. The total styrene content is 34–35% and the block styrene content is on average 25% absolute or 72–74% relative.

What is claimed is:

1. A process for the continuous solvent-free production of segment copolymers from a 1,3-diene and an aromatic vinyl compound which comprises continuously feeding 1,3-diene and aromatic vinyl compound together with a catalytic amount of a hydrocarbon lithium compound into a self-cleaning, compulsory conveying, multiple shaft screw extruder while maintaining the temperature in the extruder between 50 and 150° C. and continuously removing resultant segment copolymer from the screw extruder at a rate commensurate with the rate of said feed.

2. The process of claim 1 wherein said monomers comprise butadiene and styrene.

3. The process of claim 1 wherein said monomers comprise isoprene and styrene.

4. The process of claim 1 wherein the 1,3-diene monomer comprises 50–90% by weight of the total monomers.

References Cited

UNITED STATES PATENTS

| 3,254,053 | 5/1966 | Fisher | 260—67 |
| 3,343,922 | 9/1967 | Zimmer | 260—95 X |
| 3,356,763 | 12/1967 | Dollinger et al. | 260—880 B |

FOREIGN PATENTS

| 582,947 | 9/1957 | Canada | 260—83.7 |

JOSEPH L. SHOFER, Primary Examiner
W. F. HAMROCK, Assistant Examiner

U.S. Cl. X.R.

260—83.7, 94.2 M, 95 C